US009081606B2

(12) United States Patent
Carpenter et al.

(10) Patent No.: US 9,081,606 B2
(45) Date of Patent: Jul. 14, 2015

(54) ASYNCHRONOUS PERSISTENT STORES FOR TRANSACTIONS

(71) Applicant: International Business Machines Corporation, Armonk, NY (US)

(72) Inventors: Gary D. Carpenter, Austin, TX (US); Stefanie R. Chiras, Peekskill, NY (US); Alexandre P. Ferreira, Austin, TX (US); Jente B. Kuang, Austin, TX (US); Karthick Rajamani, Austin, TX (US); Freeman L. Rawson, III, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 13/675,546

(22) Filed: Nov. 13, 2012

(65) Prior Publication Data

US 2014/0136786 A1    May 15, 2014

(51) Int. Cl.
*G06F 12/00*     (2006.01)
*G06F 9/46*      (2006.01)
*G06F 12/14*     (2006.01)
*G06F 13/00*     (2006.01)

(52) U.S. Cl.
CPC ............ *G06F 9/466* (2013.01); *G06F 12/1416* (2013.01); *G06F 13/00* (2013.01)

(58) Field of Classification Search
CPC ............ G06F 12/0866; G06F 12/0804; G06F 12/0246; G06F 11/1441; G06F 11/2074; G06F 2212/1016; G06F 1/30; G06F 2212/312; G06F 9/3834; G06F 11/2082; G06F 12/084; G06F 12/0871; G06F 12/0873; G06F 2212/282; G06F 9/3004; G06F 9/03; G06F 2212/2022; G06F 12/00; G06F 12/08; G06F 12/1491; G06F 21/79; G06F 2212/7203; G06F 9/30181; G06F 9/321; G06F 9/44; G06F 3/0679; G06F 9/30043; G06F 9/3836; G06F 12/1416; G06F 13/00; G06F 9/467
USPC .................................................. 711/125, 103
See application file for complete search history.

(56) References Cited

U.S. PATENT DOCUMENTS

| 5,940,827 | A  | * | 8/1999  | Hapner et al. ................ 707/703 |
| 7,383,290 | B2 | * | 6/2008  | Mehra et al. ......................... 1/1 |
| 8,321,522 | B2 | * | 11/2012 | Cherian et al. ............... 709/216 |
| 2004/0181510 | A1 | * | 9/2004 | Jardin .............................. 707/2 |
| 2006/0101006 | A1 |   | 5/2006 | Schofield |
| 2011/0041006 | A1 |   | 2/2011 | Fowler |
| 2011/0246727 | A1 |   | 10/2011 | Dice et al. |
| 2012/0246392 | A1 | * | 9/2012 | Cheon .......................... 711/103 |
| 2013/0060990 | A1 | * | 3/2013 | Yeh ............................. 711/103 |
| 2013/0091331 | A1 | * | 4/2013 | Moraru et al. ................ 711/143 |

OTHER PUBLICATIONS

Fang, Ru , "High Performance Database Logging using Storage Class Memory", ICDE Conference 978-1-4244-8960-2/11 2011 , 11 pages.

(Continued)

*Primary Examiner* — Hashem Farrokh
(74) *Attorney, Agent, or Firm* — DeLizio Law, PLLC

(57) ABSTRACT

A processor includes a processor core, a cache, and a tracker. The processor core is configured to execute persistent write instructions and receive notifications of completed persistent write instructions. The tracker is configured to track the completion state of a persistent write instruction.

25 Claims, 5 Drawing Sheets

(56) References Cited

OTHER PUBLICATIONS

Frost, Christopher C., "Improving File System Consistency and Durability with Patches and BPFS", University of California, Los Angeles A dissertation submitted in partial satisfaction of the requirements for the degree Doctor of Philosophy in Computer Science 2010, 110 pages.

Langworthy, David E., "ObServer2: Extensible High Performance Support for Persistence", Department of Computer Science, Brown University, Providence, Rhode Island, CS-93-45 Jul. 25, 1993, 30 pages.

* cited by examiner

ASYNCHRONOUS PERSISTENT STORES FOR TRANSACTIONS

BACKGROUND

Embodiments of the inventive subject matter generally relate to the field of computer architecture, and, more particularly, to using non-volatile random access memory for asynchronous persistent stores.

For most of the history of computing, an important distinction was made between volatile and non-volatile memory. Volatile memory, such as the type that is generally used for random access memory (RAM), typically has lower access and write times than non-volatile memory. Volatile memory also loses the data stored in it when it is no longer supplied with power. Non-volatile memory, such as hard drives, has longer access and write times, but generally does not lose data when power is lost.

In recent years, the distinction between these two types of memory has begun to be eliminated by the increased usage of non-volatile RAM. Although non-volatile RAM has existed in some forms, such as the BIOS in most computers, the amount of storage was generally small and had limited applications. Availability of larger capacity battery-backed RAM and new RAM technologies, such as flash-backed dynamic RAM and ferroelectric RAM, provide similar access and write times to RAM while not losing stored data on power loss.

One application for non-volatile RAM is in high performance computing, such as web servers and database servers. Optimizations can be made in these situations by keeping frequently accessed data in RAM, instead of reading and writing it to the hard drive. In normal implementations, when power is lost, any data that is stored in RAM and not written to the hard disk is also lost. Using non-volatile RAM in these situations can prevent this, allowing the data to maintain consistency even after power failures, while having significantly better performance than non-volatile memory like hard drives.

SUMMARY

Embodiments of the inventive subject matter include a method of operating a computer system that allows for asynchronous persistent stores. The computer system determines that an instruction indicates a persistent write to memory. Responsive to the determination that the instruction indicates the persistent write to memory, the computer system initiates tracking of the completion state of the instruction. The computer system writes the instruction data to a cache entry indicated by a parameter of the instruction. The computer system indicates to a memory controller that the instruction indicates the persistent write to memory. The computer system receives notification that the data corresponding to the instruction has been written to the memory. Responsive to receiving the notification that the data corresponding to the instruction has been written to memory, the computer system indicates that the persistent write to memory has completed.

Embodiments of the inventive subject matter include a processor with a processor core, a cache, and a tracker. The processor core executes persistent write instructions and receives notifications of completed persistent write instructions. The tracker tracks the completion state of a persistent write instruction.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
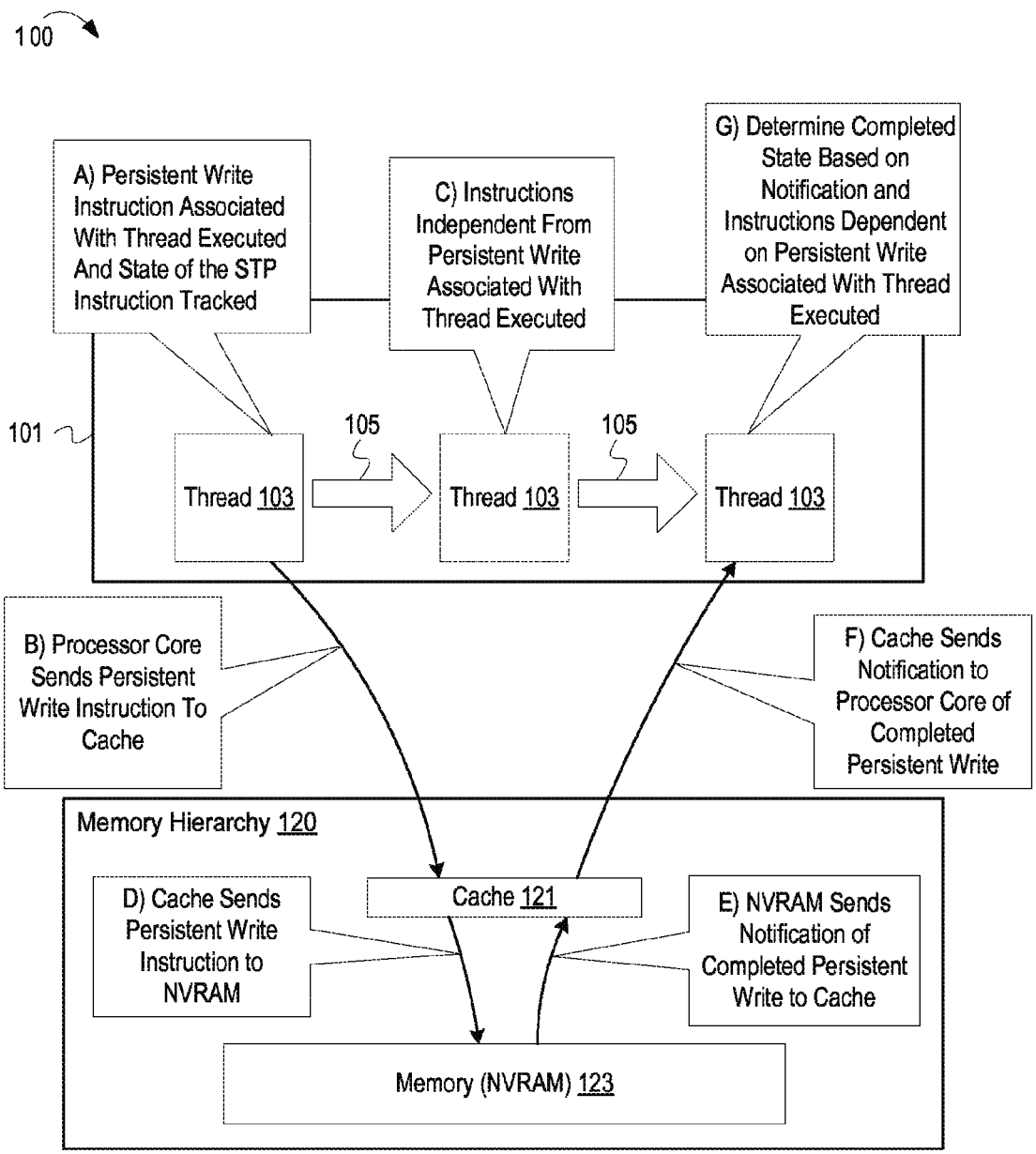
FIG. 1 depicts an example conceptual diagram illustrating selected components of a microprocessor system interacting to provide asynchronous persistent writes to NVRAM.

The description that follows includes exemplary systems, methods, techniques, instruction sequences and computer program products that embody techniques of the present inventive subject matter. However, it is understood that the described embodiments may be practiced without these specific details. For instance, although examples refer to memory controllers, some architectures use I/O controllers. Additionally, although examples refer to cache, most architectures have multiple caches. In other instances, well-known instruction instances, protocols, structures and techniques have not been shown in detail in order not to obfuscate the description.

Computer systems consist of many different hardware components. These include central processing units (commonly known as CPUs or processors) and memory, such as cache memory, random access memory (RAM) and hard drives. The central processing unit (processor) executes instructions and operates on data. The instructions and data are stored in memory. Memory can be either volatile or non-volatile. Volatile memory loses the data stored in it when power is no longer supplied to the memory. Non-volatile memory, on the other hand, retains data even after power is lost. The properties that make non-volatile memory non-volatile also tend to increase latency.

In a computer system, the various types of memory are arranged in what is called the "memory hierarchy." The memory hierarchy consists of levels of memory differentiated between each other by location, size, and latency. The lowest level in the memory hierarchy is the smallest, closest to the processor core, and has the lowest latency. Each level gets progressively larger, further from the processor core, and has higher latency. Each level may also have sublevels. The most common levels are, from lowest to highest, processor registers, cache memory (cache), RAM, and persistent storage (such as hard drives). Processor registers are very small storage locations and generally located in the processor core. Cache typically has multiple sublevels, which follow the same pattern with higher levels increasing in size and latency.

The scale between the levels can be illustrated by a comparison between cache and RAM. Cache sizes can range from less than ten kilobytes to ten megabytes or more. Cache latency typically falls below ten nanoseconds. RAM, on the other hand, can include multiple gigabytes of storage, with a latency of less than 100 nanoseconds.

Because cache and RAM are intended to have low latency, they usually consist of volatile memory. Hard drives, on the other hand, are used to store data even with no power, and thus consist of non-volatile memory.

As discussed above, memory can be either volatile or non-volatile. But a third type of memory exists that combines the low latency of volatile memory with the data persistence of non-volatile memory. This class of memory is called non-volatile RAM (NVRAM). An example of NVRAM is battery-backed RAM, which uses a battery to supply power to the RAM when no external power is available. Battery-backed RAM has generally been limited to specific applications that use small amounts of memory. Recently, high performance computer systems have started utilizing larger amounts of battery-backed RAM. Additionally, other NVRAM technologies are being developed, such as phase-change memory and spin-transfer torque RAM.

NVRAM generally exists in the same part of the memory hierarchy as RAM, and has similar functionality and limitations. For this reason, the term "main memory" will be used to refer to both. Programs generally see the cache and main memory as the one component, so the term "memory" will be used to refer to cache and main memory. Additionally, to distinguish between NVRAM and non-volatile memory with higher latency, the latter will be referred to as hard drives.

Writing data to a hard drive takes a lot of time relative to writing to memory. If power is lost during the writing of data from memory to a hard drive, the unwritten data may be lost. A similar scenario occurs when multiple operations are used to complete a task. A commonly used example is a banking software program that allows a user to transfer money between accounts. To complete a transfer, the software program debits the requested amount from the first account, and credits the amount to the second account. If power is lost after the first operation completes but before the second operation completes, the first account has been debited without a corresponding credit to the second account. This creates an unwanted imbalance between the accounts. Software programs can address this problem by using "transactions."

Transactions provide a technique to define a composite operation comprised of multiple, individual operations. In the money transfer example, the transfer would be a transaction composed of the individual credit and debit operations. Programs that implement transactions seek to satisfy the four ACID properties: atomicity, consistency, isolation, and durability.

With the availability of NVRAM as a replacement for RAM, the performance penalty for satisfying the durability property can be mitigated. Some hardware architectures allow programs to "flush" the cache. When a program requests that the cache be flushed, the data in the cache associated with that program is written to memory. If NVRAM is being used for memory, once the data is flushed to memory, it is persistent. The cache flush operation may not guarantee the data is actually written to the final location on a memory module. For example, a cache flush may write to a memory module with a cache. If power is lost before the data is written from the memory module cache to the actual memory location, the data may be lost.

Additionally, some architectures provide for functionality called a memory barrier or memory fencing. A memory barrier instruction instructs the processor to enforce ordering between store instructions before and after the memory barrier instruction. The processor will not issue a store instruction until all store instructions that occur before a memory barrier instruction are sent to the memory controller. Thus, the memory barrier instruction provides a mechanism that supports the consistency property. But the memory barrier instruction only applies to processor operations, thus the memory controller can still reorder writes, producing scenarios where consistency is not maintained. Another type of memory barrier is called an epoch. Epochs allow for the delineation of groups of writes to memory. Ordering is preserved between epochs, but writes within each epoch are permitted to be reordered. Additionally, individual epochs and the associated writes are tracked in the processor and memory hardware. This may place a practical limit on how many epochs may be used at one time.

By adding the ability for memory to notify the processor when a write is complete, a computer system can be designed to efficiently implement transactions using NVRAM. This is accomplished by designing or modifying an Instruction Set Architecture (ISA) and computer system microarchitecture. The ISA is designed or modified to define instructions or other directives that signify to the processor that the requested write is to be persistent. The computer system microarchitecture is designed to allow the processor to track states of pending persistent writes (e.g., tracking a number of pending persistent writes). The processor is further designed to allow for receipt of notifications from the memory hierarchy indicating completed persistent writes. The memory hierarchy microarchitecture is designed to receive the persistent status of a write and send notification indicating a persistent write has completed.

FIG. 1 depicts an example conceptual diagram illustrating selected components of a microprocessor system interacting to provide asynchronous persistent writes to NVRAM. FIG. 1 depicts a microprocessor system 100 including a processor 101 and a memory hierarchy 120. The processor 101 includes a thread 103. The memory hierarchy 120 includes a cache 121 and memory 123. The memory 123 comprises NVRAM. Arrows 105 indicate the passage of time.

At stage A, the processor 101 executes a persistent write instruction associated with the thread 103. In addition, the processor 101 tracks the state of the persistent write instruction. The phrase "persistent write" is used to indicate either a persistent write or persistent in-order write in this diagram. Thus, any reference to "persistent write instruction" can also correspond to a persistent in-order write instruction.

At stage B, the processor 101 sends the persistent write instruction to the cache 121. In an example implementation, the processor reads data from a processor register and writes the data into the cache 121, while setting a bit indicating the persistent nature of the write. The processor 101 also includes information identifying the thread associated with the persistent write, such as a thread identifier.

At stage C, the processor 101 executes instructions associated with the thread 103 that are independent from the completion of the persistent write. By executing instructions independent from the completion of the persistent write, the processor allows for the asynchronous functionality. Stage C may continue to operate in parallel with stages D, E, and F.

At stage D, the cache 121 sends the persistent write instruction to the memory 123. A controller of the cache 121 reads the data from the cache 121 and sends the data to the memory 123. The controller also sends a control bit indicating the persistent nature of the write as well as the information identifying the thread to the memory 123.

At stage E, the memory 123 has completed the write of the data associated with the persistent write instruction. The memory 123 sends a notification of the completed persistent write to the cache 121. The notification includes the information identifying the thread.

At stage F, the cache 121 sends the notification of the completed persistent write, including the information identifying the thread, to the processor 101.

At stage G, the processor 101 determines that the state of the persistent write instruction is now complete based on the notification. Tracking state of the persistent write allows other instructions to rely on an effective guarantee that the relevant data has been written to a persistent memory device. For instance, transactional software paradigms can leverage the persistent write instruction to implement transactions that satisfy the ACID properties. The processor 101 then executes instructions associated with the thread that are dependent on the completion of the persistent write to satisfy the demands of transactions.

A persistent write can be provided with various versions of a persistent write instruction. In addition to carrying out a persistent write, a persistent write type of instructions may also enforce order among persistent writes. Additional related instructions can be implemented that check on state of a persistent write type of instruction. ISAs include at least one instruction that allows a software program to write data from storage within the processor, such as a register, to memory. The actual instruction varies between ISAs, but the abbreviation "ST," for "store," will be used to represent the instruction. The ST instruction includes two parameters, a source register, and memory address. The ST instruction generally results in the data being written from the source register to the cache. Data in the cache may subsequently get written to memory at the discretion of the processor or operating system. To distinguish the example instructions that implement persistent writes from the ST instruction, this description refers to a STP instruction and a STPi instruction. The "STP" and "STPi" abbreviates are derived from "store persistent" and "store persistent in order", respectively. The STP instruction allows a program to take advantage of the non-volatile nature of NVRAM to provide for durability by instructing the processor to write data to NVRAM. To provide for consistency, STPi instructs the processor to write the data to NVRAM in order. Both the STP and STPi instructions include the same two parameters as the ST, a source register and memory address. An ISA is also designed to define to more instructions, the "TzPc" and "WzPc" instructions. The TzPc instruction asynchronously tests the state of persistent writes and functions similar to branching instructions. For example, it may include two parameters, each specifying the memory address of an instruction. If the processor determines that the persistent writes are complete, the processor would branch to the instruction indicated by one of the two parameters. If the processor determines that the persistent writes are not complete, the processor would branch to the instruction indicated by the other parameter. The WzPc instruction instructs the processor to block the thread until the persistent writes are complete.

Figure 2:
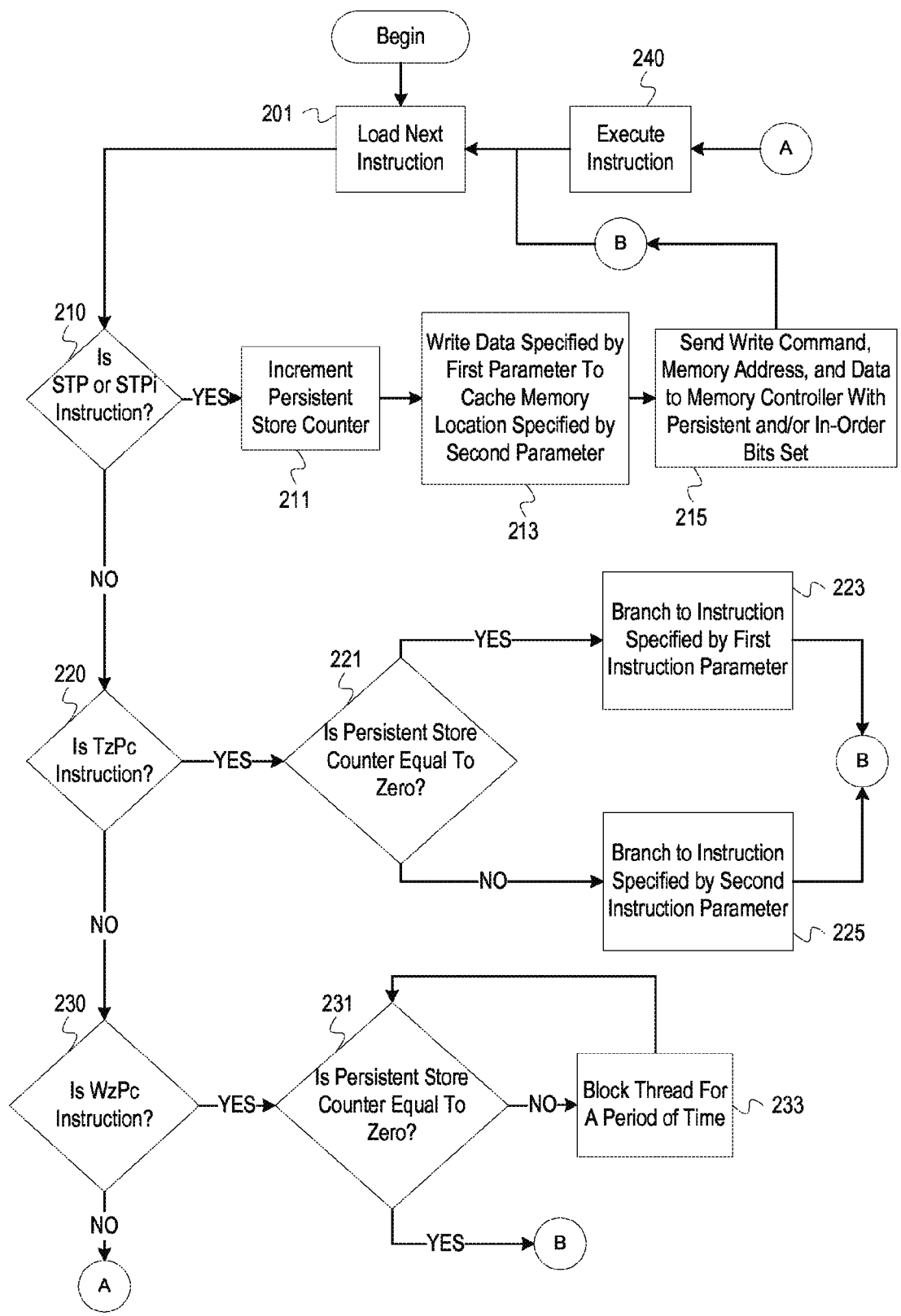
FIG. 2 depicts a flowchart of example operations for executing instructions that allows asynchronous persistent stores to memory.

FIG. 2 depicts a flowchart of example operations for executing instructions that allows asynchronous persistent stores to memory. As an example flowchart, FIG. 2 presents operations in an example order from which embodiments can deviate (e.g., operations can be performed in a different order than illustrated and/or in parallel). Control is discussed in reference to the processor. The specific details such as which component within the processor handles each operation and how each operation is accomplished will vary between architectures.

At block 201, the processor begins a loop in which it executes a series of instructions. The loop is initialized by loading the first instruction. On subsequent loops, the processor loads the next instruction. Control then flows to block 210.

At block 210, the processor decodes the instructions and determines if the instruction is a persistent store or an in-order persistent store instruction. When a thread calls the STP instruction, instead of writing the data from the source register to the cache, the processor would also write the data to the main memory. When a thread calls the STPi instruction, the processor instructs the memory controller to write the associated data only after all previous persistent writes from that thread are completed. In other words, if a thread makes two calls to the STP instruction, followed by a call to the STPi instruction, the data associated with the STPi instruction would not be written until after the data for the two STP instructions was written. If the instruction is an STP or STPi instruction, control then flows to block 211. If the processor determines the instruction is not an STP or STPi instruction, control then flows to block 220.

At block 211, the processor increments the persistent store counter associated with the current thread. To provide for asynchronous notifications, the ISA defines a counter per thread that tracks the number of persistent writes that have not completed yet. This counter is called the "persistent store counter" herein. Each time a thread uses the STP instruction, the persistent store counter for that thread is incremented. Each time the memory hierarchy notifies the processor that a persistent write has completed, the persistent store counter for the associated thread is decremented. The persistent store counter can be implemented in a variety of ways, including using a general purpose register designated as the persistent store counter or having a special register designated as the persistent store counter. Control then flows to block 213.

At block 213, the processor writes the data specified by the instruction parameter to cache. The processor chooses the cache entry based on the memory address specified in a second instruction parameter. The processor may perform additional operations based on various factors, such as the status of the cache, whether the memory address was in the cache, and the architecture design. Control then flows to block 215.

At block 215, the processor sends a write command, memory address, and associated data to the memory controller. The processor also includes whether the write is a persistent write or a persistent in-order write. Control then flows back to block 201.

If the processor determined the instruction was not an STP or STPi instruction at block 210, control then flowed to block 220. At block 220, the processor determines if the instruction is a TzPc instruction with the instruction opcode from instruction decode. The TzPc instruction allows the program to execute other instructions while asynchronously checking to see if persistent writes completed. If the instruction is a TzPc instruction, control then flows to block 221. If the processor determines the instruction is not a TzPc instruction, control then flows to block 230.

At block 221, the processor determines if the persistent store counter associated with the current thread is equal to zero. If the processor determines that the persistent store counter is equal to zero, control then flows to block 223. If the processor determines the persistent store counter is not equal to zero, control then flows to block 225.

At block 223, the processor branches to an instruction defined by one of two instruction parameters. In the actual assembly code, the parameter is generally a label, but may be a memory address. During assembly, if the parameter is a label, it is translated into the correct memory address. Control then flows to block 201.

If the processor determined that the persistent store counter associated with the current thread is not equal to zero, control flowed to block 225. At block 225, the processor branches to an instruction defined by a different instruction parameter from that used in block 223. Control then flows to block 201.

If the processor determined that the instruction is not a TzPc instruction, control then flowed to block 230. At block 230, the processor determines if the instruction is a WzPc instruction with the instruction opcode from instruction decode. This instruction allows the program to function synchronously by blocking instead of branching, as with the TzPc instruction. If the processor determines the instruction is a WzPc instruction, control then flows to block 231. If the processor determines the instruction is not a WzPc instruction, control then flows to block 240.

At block 231, the processor begins a loop where the processor determines if the persistent store counter associated with the current thread is equal to zero. The same operation occurs each time control flows to this block during the loop. If the processor determines that the persistent store counter is equal to zero, control then flows back to block 201. If the processor determines the persistent store counter is not equal to zero, control then flows to block 233.

At block 233, the processor blocks the thread for a period of time. Typically, this will involve the processor executing instructions for other threads while the thread is blocked. The length of time the thread is blocked may vary based on multiple factors, including the design of the architecture, workload of the processor, and thread priorities. After blocking the thread for a period of time, control then flows back to block 231.

If the processor determined the instruction was not a WzPc instruction at block 230, control flowed to 240. At block 240, the processor executes the instruction. Control then flows back to block 201.

An ISA can also be designed to define prefix instructions to signify that a store is to be persistent. A prefix instruction modifies the behavior of another instruction. For example, in some embodiments an ISA might define the prefixes "PER" and "PERi." The prefixes could then be used with the ST instruction, using the format "PER ST source, target." In an ISA that is designed to define multiple store instructions, this allows the persistent property to apply to any of the store instructions without having to define separate instructions.

An ISA can also be designed to define instructions that specify a block of persistent, in-order stores. For example, in some embodiments, an ISA might define the instructions "BEGIN_PERSISTENT" and "END_PERSISTENT." When the processor encounters the "BEGIN_PERSISTENT" instruction, it would make all store instructions persistent and in-order until it encountered the "END_PERSISTENT" instruction. No instructions after the "END_PERSISTENT" instruction would be executed until all stores from the persistent block were completed.

To provide for asynchronous notifications, the microarchitecture is modified to allow for notifications to be sent to the processor upon completion of persistent writes. The following are general modifications that are likely to be made, but the specific modifications will vary from architecture to architecture.

If the cache is a write-back cache, the cache is designed to function as a write-through cache for persistent stores. When data is written to a write-back cache, the cache delays writing the data to the backing store until more space is needed. The cache then "evicts" a cache line, writing it to the backing store and replacing it with the new data. A write-through cache writes data to the cache and backing store at the same time. This keeps the data in both the cache and the backing store the same. Write-back caches generally have higher performance than write-through caches because they only write data to the backing store when evicting rows, instead of on each write. This change allows the processor to write to the cache and memory simultaneously, instead of only to the cache. By making it function as a write-through cache for persistent stores, the performance of a write-back cache is maintained for non-persistent writes.

When a processor writes data to a full cache, the processor may have to wait while the cache evicts data and writes it to memory. To alleviate this delay, some processors include write buffers. A write buffer is a buffer that holds data being written from the cache to main memory. Writing the data to the write buffer takes less time than writing to main memory, thus freeing up the processor. In embodiments that include a write buffer, the write buffer is designed to not issue persistent in-order writes until all other previous persistent writes for the same thread complete. This helps to ensure proper ordering of writes.

In embodiments with multiple memory controllers managing NVRAM, the write buffer is further designed to delay persistent in-order writes if another persistent in-order write for the same thread is pending on another memory controller. If the second request was sent to a different memory controller than the first, it is possible that the second request would be written first. By delaying sending the write to the other memory controller until the first request finishes, the write buffer ensures that the second request will be written after the first.

Some write buffers also feature functionality called "write-combining." Write-combining allows the processor to combine multiple individual writes to memory into one write if more efficient. For example, a processor can write data to a particular memory address. This write goes into the write buffer. If a write for an adjacent memory address is pending in the write buffer, the two writes can be combined into one write. This decreases the number of individual writes, allowing for greater efficiency. In embodiments that allow write-combining, the write buffer is designed to ensure writes are not combined in a manner than reorders persistent writes with persistent in-order writes.

Figure 3:
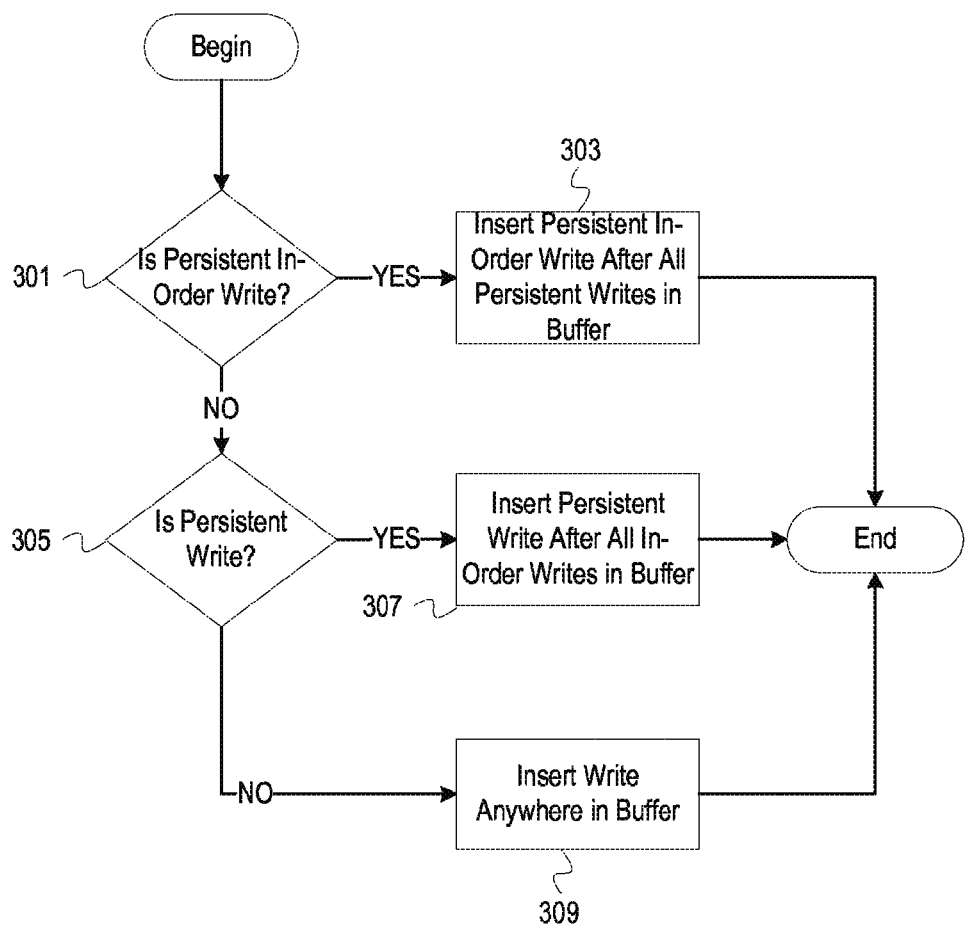
FIG. 3 depicts a flowchart of example operations for inserting non-persistent, persistent and persistent in-order writes into a buffer while maintaining data consistency.

The memory controller is designed to accept two more control signals, indicating persistent writes and persistent in-order writes. Because persistent writes are tracked on a per thread basis, the memory controller is also designed to accept the thread identifier with a write command. The memory controller keeps this thread identifier associated with the write command and data. Some memory controllers include a cache that functions like the processor cache. Similar to the processor cache, memory controllers that include a cache are designed so the memory controller cache functions as a write-through cache when a write is persistent. Furthermore, memory controllers may include a buffer similar to a write buffer. The memory controller buffers allow reordering of writes, but this functionality is modified to ensure persistent in-order writes are not reordered with other persistent writes. Persistent writes that are received before a persistent in-order write can still be reordered with other non-persistent writes and persistent writes, but not reordered with subsequent persistent in-order writes. In other words, a persistent in-order write acts as a divider that no persistent write may move in front of or behind. FIG. 3 demonstrates an example algorithm to accomplish this.

FIG. 3 depicts a flowchart of example operations for inserting non-persistent, persistent and persistent in-order writes into a buffer while maintaining data consistency. The buffer allows inserts anywhere, but only removes from the head of the buffer. This algorithm could apply to any buffer that stores writes, such as the write buffer on a processor, buffer in the memory controller, or buffer on a memory chip. As an example flowchart, FIG. 3 presents operations in an example order from which embodiments can deviate (e.g., operations can be performed in a different order than illustrated and/or in parallel).

At block 301, the control hardware determines if the write to insert is a persistent in-order write. For example, the control hardware checks for a specific control bit or opcode. If the control hardware determines the write is a persistent in-order write, control then flows to block 303. If the control hardware determines the write is not a persistent in-order write, control then flows to block 305.

At block 303, the control hardware inserts the persistent in-order write after all persistent writes, including other persistent in-order writes, that are in the buffer. This prevents reordering with any other persistent write already in the buffer. This also allows the persistent in-order write to be reordered with any non-persistent writes that are after the last persistent write.

If the control hardware determined the write was not a persistent in-order write, control flowed to block 305. At block 305, the control hardware determines if the write to insert is a persistent write. For example, the control hardware checks for a specific control bit or opcode. If the control hardware determines the write is a persistent write, control then flows to block 307. If the control hardware determines the write is not a persistent write, control then flows to block 309.

At block 307, the control hardware inserts the persistent write after all persistent in-order writes that are in the buffer. This prevents reordering with any persistent in-order writes. This also allows the persistent write to be reordered with any persistent and non-persistent writes that are after the last persistent in-order write.

If the control hardware determined the write was not a persistent write, control flowed to block 309. At block 309, the control hardware inserts the non-persistent write anywhere in the buffer. This allows the non-persistent write to be reordered with any non-persistent write, persistent write, or persistent in-order write.

For some memory, a write may be verified by the memory controller by following the write with a read of the memory address, comparing the data read with the data it attempted to write. If the data is the same, the memory controller has verified the write completed.

More advanced memory may have on-chip buffers and other features that make a read insufficient to verify if a write completed. This memory is designed to provide it with the functionality to verify the write. The specific modifications will vary between memory microarchitectures. If the memory itself may reorder writes, it is designed to prevent persistent writes from being reordered with persistent in-order writes, similar to the previously discussed buffers. Other supporting modifications include a way to track the writes, either using the thread or other identifier. The memory is also designed to send a notification back to the memory controller that the write completed.

The bus between the processor and memory controller is designed to support the added control signals indicating a persistent write and persistent in-order write. Additionally, the bus is designed to facilitate the transfer of the thread identifier from the processor to the memory controller. The bus is also designed to facilitate the transmitting of the persistent write notification to the processor, including the thread identifier.

The processor is further designed to send the added control signals and thread identifier. The processor is designed to receive the persistent write notification and thread identifier. Additionally, the processor is designed to decrement the appropriate persistent store counter upon receiving notification that a persistent write completed.

Computer systems can also be designed to include multiple memory controllers interfacing with different memory types. For example, a computer system may have two memory controllers, one that supports RAM and another that supports NVRAM. In this example, allowing a persistent write to RAM would be contrary to the purpose of the persistent write. In embodiments that support this, the operating system page table is designed to include whether each memory address is backed by volatile or non-volatile memory. Then, if a thread that is using RAM attempts to do a persistent write to memory, the operating system would generate an error, preventing the program from writing to the volatile memory.

These modifications allow the underlying architecture to provide for the consistency and durability ACID properties. The smallest unit of write that most hardware allows is at the cache line level. It is assumed that the write of a cache line will either succeed or keep the original information. This provides for the atomicity property. Isolation is dependent on high level software program functionality, and thus is realized at the application level.

Figure 4:
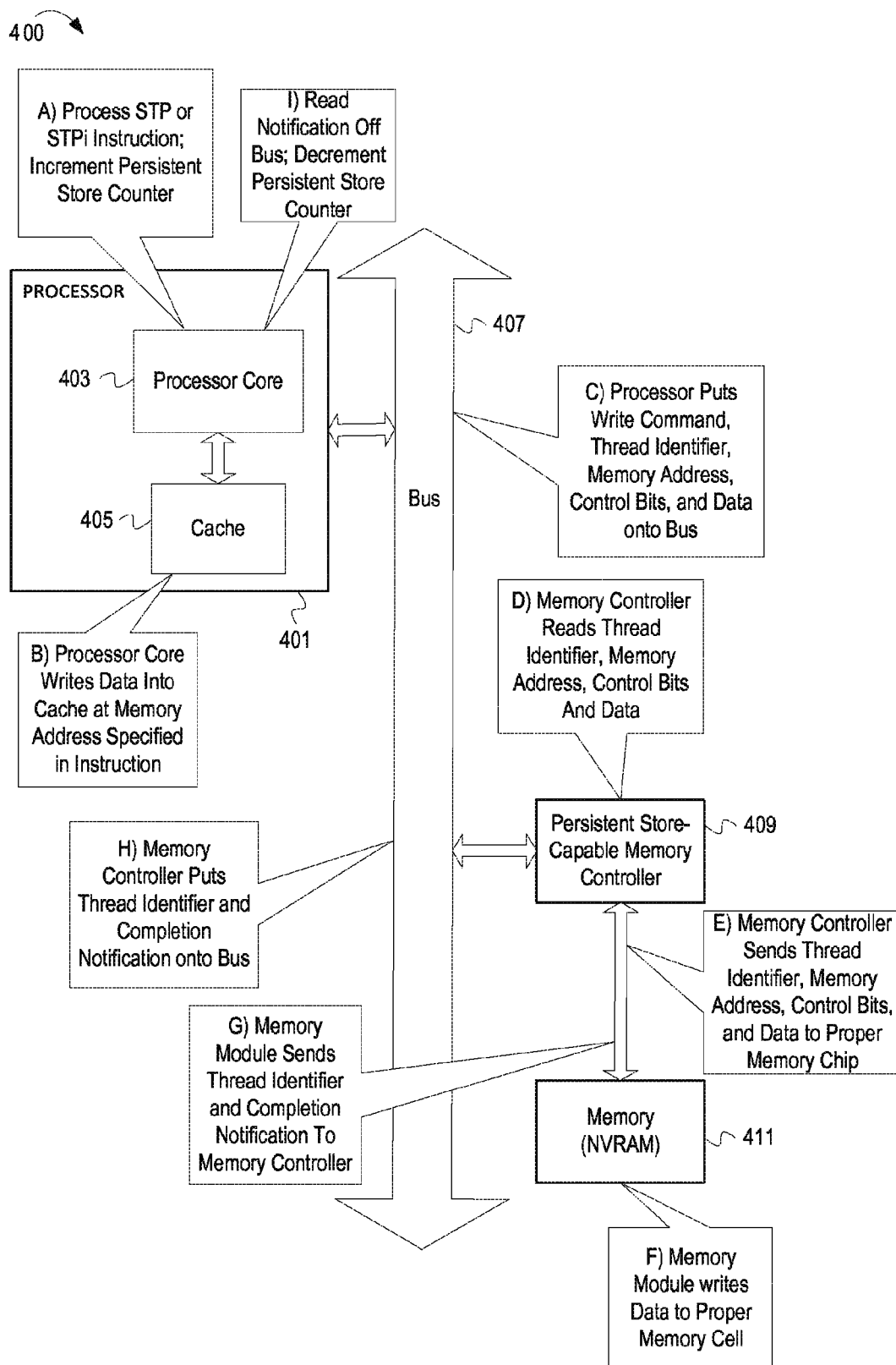
FIG. 4 depicts an example conceptual diagram of selected components of a microprocessor system for handling persistent stores.

FIG. 4 depicts an example conceptual diagram of selected components of a microprocessor system for handling persistent stores. FIG. 4 depicts a microprocessor system 400 including a processor 401, a bus 407, a persistent-store capable memory controller (memory controller) 409, and NVRAM memory (memory) 411. The processor 401 includes a processor core 403 and a cache 405.

At stage A, the processor core 403 processes an STP or STPi instruction. The processor core 403 determines that the instruction is an STP or STPi instruction by using the instruction opcode from instruction decode. The processor core 403 also determines the location of the associated data and memory address to store the data by using the instruction parameters determined from instruction decode. The processor core 403 increments the persistent store counter for the executing thread.

At stage B, the processor core 403 writes the data specified by the instruction to the cache 405. The processor core 403 writes the data into the cache 403 row indexed by the memory address provided by the instruction.

At stage C, the processor 401 puts a write command onto the bus 407. The processor 401 also sets the control bits on the bus 407 to indicate whether the write is a persistent or persistent in-order write. Additionally, the processor 401 puts the thread identifier, memory address, and data onto the bus 407. The processor 401 may put the data on the bus 407 at the same time or may put the data on the bus 407 sequentially, depending on the architecture design.

At stage D, the memory controller 409 reads the thread identifier, memory address, control bits, and data from the bus 407. Depending on the memory controller 409 design, the memory controller 409 may insert the data into a cache or a buffer, along with the thread identifier, memory address, and control bits. The memory controller 409 tracks the thread identifier and whether the write is a persistent or persistent in-order write. If the memory controller 409 has a cache, the memory controller 409 does a write-through.

At stage E, the memory controller 409 reads the thread identifier, memory address, control bits, and data from the buffer. The memory controller 409 then sends the thread identifier, memory address, control bits, and data to the memory 411.

At stage F, the memory 411 writes the data to the memory cell specified by the memory address. If the memory 411 has a cache, the memory 411 writes the data to the cache while also writing the data to the proper memory cell. If the memory 411 has a buffer, the memory 411 first writes the data into the buffer.

At stage G, after writing the data to the proper memory cell, the memory 411 sends a notification back to the memory controller 309 indicating that the write completed. The memory 411 also sends the associated thread identifier to the memory controller 409.

At stage H, the memory controller 411 puts the thread identifier and notification indicating that the write completed onto the bus 407.

At stage I, the processor core 403 reads the notification and thread identifier off of the bus 407. The processor core 403 decrements the persistent store counter for the thread indicated by the thread identifier.

Although not discussed above or depicted in the figures, there are many alternative embodiments possible. The following alternatives and variations do not constitute an exclusive list, and a specific embodiment may use any combination of the various embodiments discussed. Regarding flowcharts, not all operations illustrated and discussed are required. Additionally, other operations may be added to the processes depicted.

The TzPc instruction can be implemented in multiple ways, patterned off of the variety of branch instructions available. For example, in some embodiments, the instruction may have only one parameter. This parameter would be the instruction to jump to if the persistent store counter was zero. The single parameter could also be the instruction to jump to if the persistent store counter was not zero. In these two variations, if the test did not lead to a branch, the instruction immediately after the TzPc instruction would be executed. In general, instructions can be defined a variety of ways. This includes the order of their parameters, what kinds of parameters are allowed, and availability of prefix instructions.

In some embodiments with a load-store buffer, persistent writes are kept in the load-store buffer until they are confirmed. The processor then checks the load-store buffer to determine how many persistent stores for a thread remain. This replaces the persistent store counter.

When discussing FIG. 2, references are made to "control hardware." In some embodiments, the control functionality may be implemented in software or firmware.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable storage medium does not include transitory, propagating signals.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
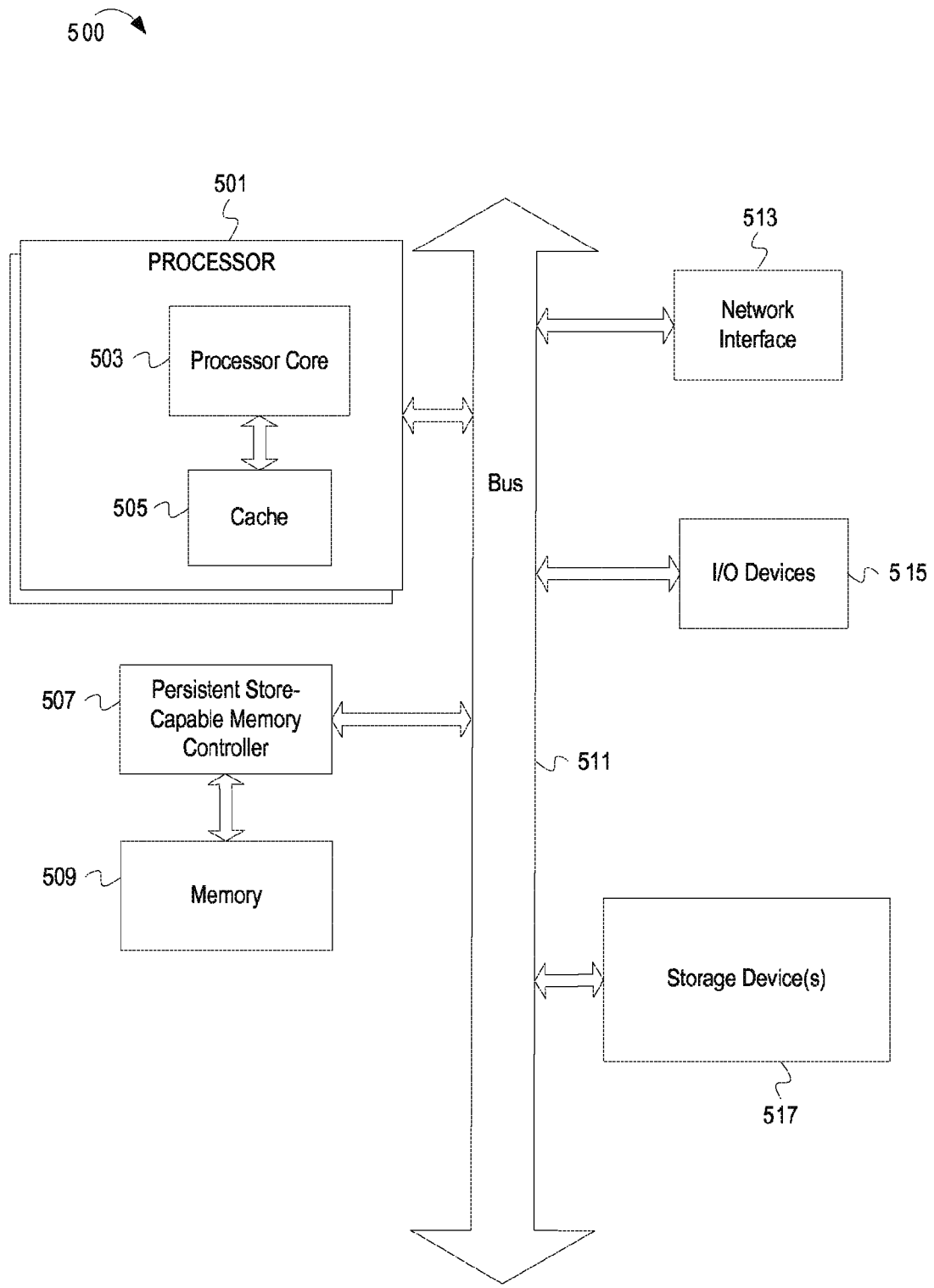
FIG. 5 depicts an example computer system with a persistent store-capable memory controller and NVRAM.

FIG. 5 depicts an example computer system with a persistent store-capable memory controller and NVRAM. A computer system includes a processor 501 (possibly including multiple processors, multiple cores, multiple nodes, and/or implementing multi-threading, etc.). The processor 501 includes at least one processor core 503 and at least one cache 505 (e.g., one or more of direct mapped cache, a 2-way set associative cache, a fully associative cache, etc.). The computer system includes a persistent store-capable memory controller (memory controller) 507 and NVRAM memory (memory) 509. The memory 503 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 511 (e.g., PCI, ISA, PCI-Express, HyperTransport bus, InfiniBand® bus, NuBus bus, etc.), I/O devices 515 (e.g., keyboard, mouse, monitor, microphone, speaker, etc.), a network interface 513 (e.g., an ATM interface, an Ethernet interface, a Frame Relay interface, SONET interface, wireless interface, etc.) and a storage device(s) 517 (e.g., optical storage, magnetic storage, etc.). The cache 505 may be a lower level cache (e.g., L1 cache embodied in a processor) or a higher level cache (e.g., L2 cache, L3 cache, etc.). The processor core 503, cache 505, memory controller 507, memory 509, bus 511 embody functionality to implement embodiments described above. The memory controller 507 functions as described above, recognizing control bits indicating that a write is persistent or persistent in-order. The memory controller 507 also sends a notification back to the processor 501 indicated that a persistent or persistent in-order write completed. The memory 509 functions as described above, verifying persistent and persistent in-order writes complete and sending a notification back to the memory controller 507. Any one of these functionalities may be partially (or entirely) implemented in hardware and/or on the processing unit 501. For example, the functionality may be implemented with an application specific integrated circuit, in logic implemented in the processing 501, in a co-processor on a peripheral device or card, etc. Further, realizations may include fewer or additional components not illustrated in FIG. 5 (e.g., video cards, audio cards, additional network interfaces, peripheral devices, etc.). The processor 501, storage device(s) 517, network interface 513, memory controller 507, and I/O devices 515 are coupled to the bus 511.

While the embodiments are described with reference to various implementations and exploitations, it will be understood that these embodiments are illustrative and that the scope of the inventive subject matter is not limited to them. In general, techniques for using non-volatile random access memory as persistent stores as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

As used herein, the term "or" is inclusive unless otherwise explicitly noted. Thus, the phrase "at least one of A, B, or C" is satisfied by any element from the set {A, B, C} or any combination thereof, including multiples of any element.

What is claimed is:

1. A method comprising:
    determining, by a processor of a microprocessor system, that an instruction for execution on the processor indicates a persistent write to memory, wherein the microprocessor system comprises a cache, a memory controller, a bus coupling the processor to the memory controller, and the memory, wherein the memory is coupled with the memory controller;
    in response to said determining that the instruction for execution on the processor indicates the persistent write to memory, initiating tracking of a completion state of the instruction;
    writing, by the processor, data associated with the instruction to a cache entry of the cache, wherein the cache entry is indicated by a parameter of the instruction;
    indicating to the memory controller, by the processor via the bus, that the instruction indicates the persistent write to memory;
    receiving, by the processor, from the memory controller via the bus, a notification that the data associated with the instruction has been written to the memory, wherein the data associated with the instruction is written to the memory by the memory controller; and
    in response to receiving the notification that the data associated with the instruction has been written to the memory, indicating that the persistent write to memory has completed.

2. The method of claim 1, wherein the instruction comprises one of a persistent store instruction and an in-order persistent store instruction.

3. The method of claim 2, wherein said determining that the instruction for execution on the processor indicates the persistent write to memory comprises:
    determining that the instruction contains a prefix; and
    in response to said determining that the instruction contains the prefix, determining whether the prefix indicates a persistent store instruction or an in-order persistent store instruction.

4. The method of claim 2 further comprising:
    determining that the instruction is an in-order persistent store instruction; and
    in response to said determining that the instruction is an in-order persistent store instruction, ensuring that data associated with the instruction is written in order with respect to data associated with one or more other instructions.

5. The method of claim 4, wherein said ensuring that the data associated with the instruction is written in order with respect to the data associated with the one or more other instructions comprises:
   locating, by the memory controller, an indication of the most recent persistent store instruction or in-order persistent store instruction in a buffer, wherein the buffer is associated with the memory controller; and
   in response to said locating the indication of the most recent persistent store instruction or in-order persistent store instruction in the buffer, inserting into the buffer, by the memory controller, an indication of the instruction after the indication of the most recent persistent store instruction or in-order persistent store instruction.

6. The method of claim 1, wherein said initiating the tracking of the completion state of the instruction comprises at least one of:
   incrementing a register designated to host a counter associated with a thread, wherein the thread is associated with the instruction; or
   writing an indication of the instruction into a buffer.

7. The method of claim 1, wherein said indicating that the persistent write to memory has completed comprises at least one of:
   decrementing a register designated to host a counter associated with a thread, wherein the thread is associated with the instruction; or
   removing an indication of the instruction from a buffer.

8. A method comprising:
   determining, by a processor of a microprocessor system, that an instruction for execution on the processor indicates a persistent write to memory, wherein the microprocessor system comprises a cache, a memory controller, a bus coupling the processor to the memory controller, and the memory, wherein the memory is coupled with the memory controller;
   in response to said determining that the instruction for execution on the processor indicates the persistent write to memory, setting a hardware counter to a value, wherein the hardware counter is designated to host a value for the thread associated with the instruction;
   writing, by the processor, data associated with the instruction to a cache entry of the cache, wherein the cache entry is indicated by a parameter of the instruction;
   indicating to the memory controller, by the processor via the bus, that the instruction indicates the persistent write to memory;
   receiving, by the processor, from the memory controller via the bus, a notification that the data associated with the instruction has been written to the memory, wherein the data associated with the instruction is written to the memory by the memory controller; and
   in response to receiving the notification that the data associated with the instruction has been written to the memory, setting the hardware counter designated to host a value for the thread associated with the instruction to another value.

9. A computer program product comprising:
   a non-transitory computer readable storage medium having computer usable program code embodied therewith, the computer usable program code comprising computer usable program code to,
      determine, by a processor of a microprocessor system, that an instruction for execution on the processor indicates a persistent write to memory, wherein the microprocessor system comprises a cache, a memory controller, a bus coupling the processor to the memory controller, and the memory, wherein the memory is coupled with the memory controller;
      in response to a determination that the instruction for execution on the processor indicates the persistent write to memory, initiate tracking of a completion state of the instruction;
      write, by the processor, data associated with the instruction to a cache entry of the cache, wherein the cache entry is indicated by a parameter of the instruction;
      indicate to the memory controller, by the processor via the bus, that the instruction indicates the persistent write to memory;
      receive, by the processor, from the memory controller via the bus, a notification that the data associated with the instruction has been written to the memory, wherein the data associated with the instruction is written to the memory by the memory controller; and
      in response to receiving a notification that the data associated with the instruction has been written to the memory, indicate that the persistent write to memory has completed.

10. A processor comprising:
    a processor core coupled with a bus, the processor core configured to,
       execute a persistent write instruction, wherein the persistent write instruction is associated with data to be written to memory;
       in response to execution of the persistent write instruction, transmit, over a bus coupled with the processor, the data to be written to the memory and an indication that the memory is associated with a persistent write instruction; and
       receive, via the bus, a notification that the data to be written to memory was written to the memory and
    a cache.

11. The processor of claim 10,
    wherein the processor core further comprises a tracker,
    wherein the tracker comprises a plurality of physical registers designated to host the completion state of persistent write instructions.

12. The processor of claim 11, wherein the processor core is further configured to:
    further in response to execution of the persistent store instruction, increment a first of a plurality of physical registers designated to host the completion state of persistent write instructions; and
    in response to reception of a notification that the data to be written to memory was written to the memory, decrement the first of a plurality of physical registers designated to host the completion state of persistent write instructions.

13. The processor of claim 10, wherein the processor core further comprises a buffer designated to host indications of incomplete persistent write instructions, wherein the processor core is further configured to:
    further in response to execution of the persistent store instruction, insert an indication of the persistent store instruction into the buffer designated to host indications of incomplete persistent write instructions; and
    in response to reception of a notification that the data to be written to memory was written to the memory, remove an indication of the persistent store instruction associated with the data that was written to the memory.

14. The processor of claim 13, wherein the processor core is further configured to:

execute a check instruction, and;
in response to execution of the first instruction, determine whether any indications of incomplete persistent write instructions are hosted in the buffer.

15. The processor of claim 10, wherein the cache is configured to function as a write-through cache for persistent write instructions.

16. The processor of claim 10, wherein the persistent write instruction comprises an in-order persistent write instruction.

17. The processor of claim 10, wherein the processor core is further configured to:
execute a check instruction, wherein the persistent write instruction and the check instruction are associated with a thread;
block the thread;
determine whether any indications of incomplete persistent write instructions are hosted in the buffer; and
in response to a determination that no indications of incomplete persistent write instructions are hosted in the buffer, unblock the thread.

18. A system comprising:
a processor comprising a processor core;
a memory controller coupled to the processor via a bus, the memory controller comprising a buffer; and
memory coupled to the memory controller;
wherein the processor core is configured to,
determine that a first instruction is a persistent store instruction, wherein the first instruction is associated with first data; and
in response to a determination that the first instruction is a persistent store instruction, send the first data and an indication that the first data is associated with a persistent store instruction to the memory controller via the bus;
wherein the memory controller is configured to,
receive the first data and the indication that the first data is associated with a persistent store instruction;
in response to receiving the first data and the indication that the first data is associated with a persistent store instruction, insert an indication of the first data into the buffer; and
send, to the processor core via the bus, an indication that the first data has been written to memory.

19. The system of claim 18, wherein the buffer is ordered, wherein the indication of the first data is inserted into the buffer behind all indications of data associated with any in-order persistent store instructions.

20. The system of claim 18, wherein the indication of the first data comprises the first data.

21. The system of claim 18,
wherein the processor core is further configured to:
determine that a second instruction is an in-order persistent store instruction, wherein the second instruction is associated with second data; and
in response to a determination that the second instruction is an in-order persistent store instruction, send the second data and an indication that the second data is associated with an in-order persistent store instruction to the memory controller via the bus;
wherein the memory controller is further configured to:
receive the second data and the indication that the second data is associated with an in-order persistent store instruction;
in response to receiving the second data and the indication that the second data is associated with an in-order persistent store instruction, insert an indication of the second data into the buffer, wherein the buffer is ordered, wherein the indication of the second data is inserted into the buffer behind all indications of data associated with any persistent store instructions; and
send, to the processor core via the bus, an indication that the second data has been written to memory.

22. The system of claim 18,
wherein the memory controller is further configured to write the first data to the memory,
wherein the memory controller configured to send, to the processor core via the bus, the indication that the first data has been written to memory comprises the memory controller being configured to send, to the processor core via the bus, the indication that the first data has been written to memory in response to writing the first data to the memory.

23. The system of claim 18,
wherein the memory controller is further configured to:
send, to the memory, the first data and the indication that the first data is associated with a persistent store instruction;
wherein the memory is configured to:
receive the first data and the indication that the first data is associated with an a persistent store instruction;
store the first data in a location within the memory; and
send, to the memory controller, an indication that the first data has been written to memory;
wherein the memory controller configured to send, to the processor core via the bus, the indication that the first data has been written to memory comprises the memory controller configured to send, to the processor core via the bus, the indication that the first data has been written to memory in response to receiving, from the memory, the indication that the first data has been written to memory.

24. The system of claim 23,
wherein the first instruction is associated with a thread identifier;
wherein the processor core configured to send the first data and the indication that the first data is associated with a persistent store instruction to the memory controller via the bus comprises the processor core configured to:
send the first data, an indication that the first data is associated with a persistent store instruction, and the thread identifier to the memory controller via the bus;
wherein the memory controller configured to send, to the memory, the first data and the indication that the first data is associated with a persistent store instruction comprises the memory controller configured to:
send, to the memory, the first data, the indication that the first data is associated with a persistent store instruction, and the thread identifier;
wherein the memory configured to send, to the memory controller, an indication that the first data has been written to memory comprises the memory configured to:
send, to the memory controller, an indication that the first data has been written to memory and the thread identifier;
wherein the memory controller configured to send, to the processor core via the bus, the indication that the first data has been written to memory comprises the memory controller configured to:
send, to the processor core via the bus, the indication that the first data has been written to memory and the thread identifier.

25. The system of claim 18,
wherein the first instruction is associated with a thread identifier;

wherein the processor core configured to send the first data and the indication that the first data is associated with a persistent store instruction to the memory controller via the bus comprises the processor core configured to:
   send the first data, an indication that the first data is associated with a persistent store instruction, and the thread identifier to the memory controller via the bus;

wherein the memory controller configured to send, to the processor core via the bus, the indication that the first data has been written to memory comprises the memory controller configured to:
   send, to the processor core via the bus, the indication that the first data has been written to memory and the thread identifier.

\* \* \* \* \*